United States Patent Office 3,843,536
Patented Oct. 22, 1974

3,843,536
METAL-DEACTIVATED ORGANIC COMPOSITIONS AND PROCESS THEREFOR
Thomas E. Johnston, Wilmington, Del., assignor to E. I. du Pont de Nemours and Company, Wilmington, Del.
No Drawing. Filed Dec. 1, 1972, Ser. No. 311,395
Int. Cl. C10m 1/32
U.S. Cl. 252—51.5 R          11 Claims

ABSTRACT OF THE DISCLOSURE

Disclosed herein are organic compositions, whose oxidation is ordinarily catalyzed by the metal ions of copper, iron, cobalt and chromium, said compositions containing metal-deactivating amounts of a compound of the formula

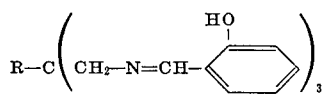

wherein R is hydrogen or an alkyl group having from 1 to 20 carbon atoms; and a process therefor.

BACKGROUND OF THE INVENTION

Field of the Invention

This invention relates to a process for overcoming the catalytic effects of copper, iron, cobalt, and chromium in the oxidation of organic compositions, and to the stabilized organic compositions that result.

Description of the Prior Art

Most organic substances such as hydrocarbon fuels and lubricants, animal and vegetable fats and oils, synthetic lubricants and polymers in general undergo undesirable deterioration upon exposure to the atmosphere. It is generally agreed that such deterioration is due to oxidation by atmospheric oxygen, such deterioration being manifested by one or more changes such as the formation of deposits, discoloration, the development of odor, viscosity changes, embrittlement and the like. It is almost a universal practice in the art to use antioxidants to suppress the oxidation of the organic substances by atmospheric oxygen.

It is also well known in the art that certain metal ions exert a marked catalytic effect upon the atmospheric oxidation process and in many instances as little as a few parts per million of these metal ions can completely overcome the protective effect of antioxidants. For instance, it is a common practice to stabilize hydrocarbon fuels by using a combination of antioxidants and substances which can nullify the catalytic activities of copper and compounds thereof, such substances being known as copper deactivators. The most widely used copper deactivators are those based on the condensation products of salicylaldehyde and aliphatic diamines, particularly 1,2-diaminopropane. Such products are more fully described in U.S. 2,181,121, U.S. 2,181,122, U.S. 2,284,267, U.S. 2,813,080 and U.S. 3,071,451.

It is, however, recognized in that art that metal ions other than those of copper are also active as oxidation catalysts and that these metal ions can be present in organic substances as contaminants, such metal ions being, for example, those of iron, cobalt and chromium which are unavoidably introduced during processing and storage. While the above-described metal deactivators based on salicylaldehyde and diamines (particularly 1,2-diaminopropane) are effective in deactivating copper, their combinations with iron and cobalt show greater catalytic activity than the metal ions alone in many cases.

Most metal deactivators are compounds which contain two or more electron donating groups and can form chelates with the metal ions. The most generally used metal deactivating compounds are the condensation products of salicylaldehyde with aliphatic diamines. N,N'-bis salicylidene-1,2-diaminopropane is believed to coordinate with copper ion through its electron donor groups, forming a tricyclic chelate structure represented by

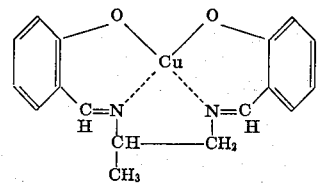

Formation of a metal chelate, as exemplified above, does not mean that the metal ion thus chelated is necessarily "deactivated." In fact, as pointed out in an article by Pedersen, at Ind. and Eng. Chem. Vol. 41, 924–928 (1949), the chelation of iron and cobalt with N,N'-bis salicylidene-1,2-diaminopropane actually increased their catalytic activities. Similarly in "Atmospheric Oxidation and Antioxidants" by Gerald Scott, Elsevier Publishing Co., 1965, page 176 it is stated, ". . . although strong chleation is necessary, it is not in itself a sufficient criterion of an efficient metal deactivator. For example it has been found that N,N'-(disalicylidene)ethylenediamine and related compounds are effective inhibitors for copper but activators for iron. Furthermore, the cobalt complexes of these materials are among the most powerful activators of auto-oxidation known and have been found to possess the haemin-like property of absorbing molecular oxygen, probably by direct coordination into the metal."

In the Journal of the American Chemical Society, Vol. 79, pp. 1269–1275 (1957), Dwyer et al. have described the preparation of the iron and cobalt chelates of

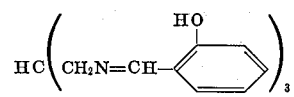

in order to demonstrate the formation of non-superposable enantiomorphous forms which could be separated into their optically active antipodes. There is no disclosure or suggestion of the chemical activity of the chelated metal ions in this article.

In view of the fact that the electron donating chelating groups in the N,N',N''-tris salicylidene triamine compounds are the same as those of the N,N'-bis salicylidenediamine compounds, it was unexpected that the present compounds would be effective in deactivating iron, cobalt and chromium in addition to copper since, as discussed above, the N,N'-bis salicylidenediamine compounds are not deactivators for iron and cobalt, but activators.

SUMMARY OF THE INVENTION

This invention relates to a stable metal-deactivated organic composition comprising an organic composition that is ordinarily susceptible to catalytic oxidation by a metal selected from the group consisting of copper, iron, cobalt and chromium and compounds thereof and an effective metal-deactivating amount of a compound of the formula

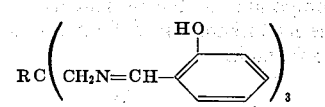

wherein R is hydrogen or an alkyl group having from about 1 to 20 carbon atoms.

The novel process of this invention comprises stabilizing an organic composition that is ordinarily susceptible to oxidation catalyzed by a metal selected from the group consisting of copper, iron, cobalt, chromium, and compounds thereof, with an effective metal-deactivating amount of a compound having the formula

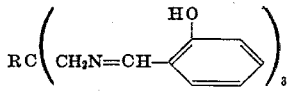

wherein R is hydrogen or an alkyl group having from about 1 to 20 carbon atoms.

The preferred metal-deactivating compound is

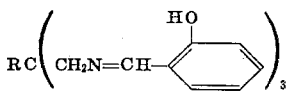

wherein R is $C_1$ to $C_4$ alkyl.

In this disclosure, by composition ordinarily susceptible to oxidation and catalysis thereof by copper, iron, cobalt and chromium, is meant those compositions that are predominantly organic in nature and include, *inter alia*, vegetable and animal oils and fats; distillate hydrocarbon fuels including gasoline, jet fuels, kerosene, diesel and home burner fuels oils, lubricating oils and greases; synthetic lubricants; synthetic polymers including polyamides, polyesters, hydrocarbon polymers and the like. The invention is particularly useful for the distillate hydrocarbon fuels and lubricating oils and greases.

At least one gram mole of metal-deactivator is used for each gram atom of the metal and preferably from about 1.5 to 100 gram moles of the metal-deactivator compound per gram atom of the metal in the organic substance. The higher ratio is desirable when the organic substance is in contact with the metal which can serve as a reservoir of metal ions. Concentrations of from about 0.001% to about 0.5% by weight of the metal-deactivator compound in the organic substance are generally satisfactory. The deactivating compound reacts with the metal or compound thereof so that the reaction product will not catalyze oxidation of the host composition.

DETAIL OF THE INVENTION

The 1,1,1 - tris(salicylideneaminomethyl)alkanes used in the present invention are readily prepared by the art-known procedure of condensing an amine with salicylaldehyde to form the azomethine compound. Thus, the tris(salicylideneaminomethyl)alkanes are prepared by the condensation of three moles of salicylaldehyde with one mole of 1,1,1-tris(aminomethyl)alkane, such condensation being brought about by heating in the presence or absence of a solvent such as benzene, toluene, xylene, methanol, ethanol, propanol, butanol, diethyl ether, dipropyl ether, dioxane, and the like. Following the completion of the reaction, indicated by the evolution of three moles of water per mole of the amine, water, solvent and any unreacted ingredients may be removed by any suitable means, such as by distillation. Generally, a substantially quantitative yield of the tris(salicylidene) compound is obtained so that upon distillation removal of the water and the solvent, the product obtained can be used directly without any further purification. If desired, the product may be purified by recrystallization from a solvent such as diethyl ether.

The amines useful for the preparation of the tris(salicylidene) compounds of the present invention are 1,1,1-tris(aminomethyl)alkanes. For the preparation of a compound of the formula

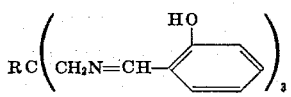

wherein R is a hydrogen, the amine used in the condensation with salicylaldehyde is tris(aminomethyl)methane. The preparation of tris(aminomethyl)methane is described in J. Org. Chem., Vol. *11*, 736 (1946) by Geisman *et al.* which preparation involves Curtius degradation of methanetriacetic acid. The amines required for the preparation of

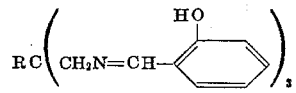

wherein R is an alkyl group of 1 to 20 carbon atoms, are readily prepared from 1,1,1-tris(methylol)alkanes by well-known procedures of converting alcohol groups to amine groups such as by (1) preparation of sulfonate esters followed by ammonolysis with ammonia or (2) converting the hydroxyl groups to halide groups by treating with halogenating compounds such as thionyl chloride and then subjecting the intermediate trihalide to ammonolysis. The 1,1,1-tris(methylol)alkanes, particularly those of ethane and propane are commercially available, while the others are readily prepared by the well known procedure of condensing aldehydes containing two β-hydrogens with formaldehyde under alkaline conditions. Thus, as an example, to prepare 1,1,1-tris(methylol) pentane, three moles of formaldehyde are reacted with one mole of n-hexylaldehyde, which reaction can be represented by the equation

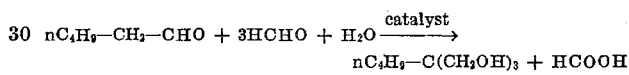

$$nC_4H_9-CH_2-CHO + 3HCHO + H_2O \xrightarrow{\text{catalyst}}$$
$$nC_4H_9-C(CH_2OH)_3 + HCOOH$$

The formation of the tris-methylol compound can be explained in terms of the initial aldol-type condensation between the aldehyde and the two formaldehyde molecules followed by the Cannizzaro-type reaction between the intermediate bis(methylol)aldehyde and the third formaldehyde molecule. It is clear from the above that any aliphatic aldehyde containing 2 β-hydrogens can be used to prepare the 1,1,1-tris(methylol)alkane. Thus, the R group of tris(aminoethyl)alkane, $RC(CH_2-NH_2)_3$, used in the condensation with salicylaldehyde and therefore also the R group of

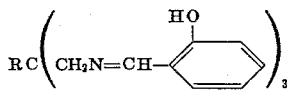

can be a straight chain or a branched chain alkyl group of 1 to 20 carbon atoms.

The aldehydes useful are α-monoalkylacetaldehydes which can be represented by $RCH_2CHO$ and include aldehydes wherein R is methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl as well as the various isomeric forms of these alkyl groups. Aldehydes wherein the R groups of the α-monoalkylacetaldehyde are $C_1$–$C_4$ alkyl, are perferred for the preparation of

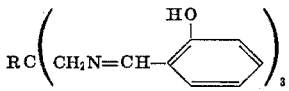

wherein R is a $C_1$ to $C_4$ alkyl. The most preferred aldehydes will have R groups of $CH_3$ or $C_2H_5$.

As the size of the R group increases the solubility of the compound in organic substances, particularly in hydrocarbon media increases, so that where enhanced solubility is desired longer chain R groups may be preferred. Increased solubility is also obtained by providing substituents on the benzene ring of the salicylaldehyde portion of the molecule.

The organic substances into which the metal deactivator compounds of the invention are to be incorporated may also contain other additives commonly used to impart certain desirable characteristics not possessed by the organic substances or to enhance certain characteristics of the organic substances. For example, when the organic substance is a hydrocarbon fuel, such hydrocarbon fuel may contain antiknock compounds such as tetraalkyllead, antioxidants, dyes, anti-rust agents, anti-icing agents, detergents.

When the organic substance is a hydrocarbon lubricating oil such oil may contain viscosity index improvers, pour point depressants, pour improvers, detergents, antirust agents, antioxidants, anti-foam agents, dispersants and the like. Since the present invention provides a process for stabilizing organic substances susceptible to oxidation catalyzed by certain metal ions, it is desirable that the organic substance also contain one or more antioxidants for enhanced stability. Since the tris(salicylidene) compounds of the invention possess very little or no antioxidant activity, it is highly desirable to use these compounds together with antioxidants.

The combination of the metal deactivator compound of the invention and an antioxidant provides stabilization against oxidation greater than either component alone since the effective deactivation of the catalytic metal ions by the metal deactivator allows the antioxidant to exhibit its full poential as an antioxidant. Useful antioxidants are substituted arylamines and phenols. Antioxidants commonly used in hydrocarbon fuels and lubricants include N,N'-di-sec-butyl-p-phenylenediamine, N-n-butyl-p-aminophenol, 2,6-di-tert-butyl-p-cresol, 2,4-dimethyl - 6 - t-butylphenol, 2-t-butylphenol, 2,4-di-t-butylphenol, 2,4,6-tri-t-butylphenol, 2,2',4,4' - tetra - t - butylmethylenebisphenol, 2,2'-di-t-butyl-6,6'-dimethylmethylenebisphenol, phenyl $\alpha$- and $\beta$-naphthylamines, alkylated phenyl $\alpha$- and $\beta$-naphthylamines and the like. For animal and vegetable oils and fats the antioxidants include butylated hydroxyanisole, 2,6-di-tert-butyl-p-cresol and the like. For polymers the antioxidants include 2,6 - di-tert-butyl-p-cresol, 2,4,6 - tri-tert-butylphenol, 2,2',4,4'-tetra-tert-butylmethylenebisphenol and the like.

The metal deactivator of this invention is incorporated into the organic substance in any suitable manner known in the art to obtain intimate mixing of the metal deactivator with the organic substance. Such procedures may include addition to the organic substance of the compound itself or a solution thereof in a suitable solvent such as benzene, toluene, xylene, methanol, ethanol, diethyl ether, dioxane and the like, which solution may contain other additives to be incorporated into the organic substance, and intimate mixing accomplished by agitating in a tank with stirrers, pumping through an orifice mixer, or mixing in a polymer mixer such as a Banbury mixer and the like, the suitable procedure being determined by the nature of the organic substance.

DESCRIPTION OF THE PREFERRED EMBODIMENTS

Preparative details are given for 1,1,1-tris(salicylideneaminomethyl)propane which is a representative metal deactivator contemplated to be employed in this invention. Examples illustrating the invention follow the preparative details.

PREPARATIVE DETAILS

A mixture of 134 g. of 1,1,1-tris(methylol)propane and 474 g. pyridine is cooled to 0° C. and 592 g. of p-toluenesulfonyl chloride is added slowly with stirring such that the temperature does not exceed 10° C. After about two hours, the mixture is a solidified mass of white crystals. The solidified mixture is slurried with 1 liter of 5% aqueous hydrochloric acid-ice mixture, and the product is recovered by filtration. The solid is recrystallized from toluene yielding white plates, m.p. 140°–140.5° C. Elemental analysis showed 55.8% C, 5.3% H and 16.3% S whereas the calculated values for $C_{27}H_{32}O_9S_3$ are 55.4% C, 5.4% H and 16.1% S. Yields of 82–90% of the recrystallized p-toluenesulfonate ester of 1,1,1-tris(methylol)propane are readily obtained.

A clean, dry, autoclave is charged with 500 ml. of triethylamine, 298 g. of the above p-toluenesulfonate ester, and 350 g. of ammonia. The autoclave is sealed and then heated with agitation at 150° C. for 10 hours. The autoclave is cooled and the content is transferred to a reaction flask along with 700 ml. of toluene and 100 ml. of a sodium hydroxide solution (60 g. sodium hydroxide in 100 ml. of distilled water). The content of the flask is briefly refluxed and the water is removed by distillation. The hot mixture is then filtered and the collected solid material is washed with triethylamine, and the washings are combined with the original filtrate. The removal of the solvents from the combined filtrate and the washings by distillation and the subsequent distillation of the residue yield only one fraction boiling at 76°–78° C. at 0.2 mm. Hg pressure.

Elemental analysis of the distillate showed 54.5% C, 13.1% H and 31.2% N whereas the calculated values for 1,1,1-tris(aminomethyl)propane are 54.9% C, 13.1% H and 32.0% N. Vapor phase chromatographic analysis indicate that the distilled material is at least 95% pure. Nuclear magnetic resonance (NMR) and the other spectral data confirm the product as 1,1,1-tris(aminomethyl)propane. It is important that during the preparation and isolation of the triamine, carbon dioxide and oxygen be excluded since the triamine appears to have a great affinity for them.

To a mixture of 31 g. of freshly distilled salicylaldehyde and 50 ml. of anhydrous methanol, a mixture of 10 g. of 1,1,1-tris(aminomethyl)propane and 50 ml. of anhydrous methanol is added dropwise. The combined mixture is then heated to reflux and the methanol is removed by distillation while a corresponding amount of toluene is being added to the reaction mixture. Distillation of the reaction mixture is continued to remove toluene-water azeotrope. When the toluene distillate is clear (after the removal of 4.1 g. of water indicating the completion of the condensation reaction) the remainder of toluene is removed by distillation under reduced pressure.

The residual orange oil is dissolved in four times its volume of diethyl ether and stored overnight at −20° C. Yellow needles are obtained and are isolated by filtration. The crude material 33.5 g. (99% yield) melts at 103–105° C. and can be used without further purification. If desired, the crude product may be further purified by recrystallization from diethyl ether to give a product whose elemental analyses are 73.7% C, 6.1% H and 9.5% N, while the calculated values for 1,1,1-tris(salicylideneaminomethyl)propane are 73.2% C, 6.6% H and 9.5% N, and whose melting point is 104° C.–105° C. Differential thermal analysis (DTA) and differential scanning colorimetry (DSC) show only one exotherm at around 325° C. in either helium or air.

By using 1,1,1-tris(methylol)ethane as the starting compound instead of 1,1,1-tris(methylol)propane and using a procedure essentially as described above 1,1,1-tris(salicylideneaminomethyl)ethane (m.p. 137.5°–140° C., 72.7% C, 6.4% H and 9.8% N; calculated 72.2% C, 6.9% H and 9.7% N) was prepared.

EXAMPLES 1–4 AND COMPARISONS

These Examples and Comparisons illustrate the catalytic effects of metals, and the selective deactivating effects of 1,1,1-tris(salicylideneaminomethyl)propane on copper, iron, cobalt and chromium in the oxidation of gasoline. The test used was ASTM–524 Method, "Oxidation Stability of Gasoline (Induction Period Method)."

The test involved measuring the induction period when a sample of gasoline and oxygen (100 p.s.i.) were heated in a bomb at 208°–216° F. (98°–102° C.), the induction period being defined as the time elapsed between the placing of the bomb in the 208°–216° F. bath and the break point. The break point is the point in the pressure-time curve that is preceded by a pressure drop of exactly 2 p.s.i. (0.15 kg. per sq. cm.) within 15 minutes and succeeded by a drop of not less than 2 p.s.i. in 15 minutes. Metals which show catalytic effects in the oxidation of the gasoline decrease the induction period, whereas when such catalytic metals are deactivated, the induction periods are restored to the control values, i.e. induction periods of the gasoline in the absence of catalytic metals.

To facilitate the addition of a precise amount of metal to the gasoline, stock solutions of metal salts in toluene were prepared by dissolving the indicated amounts of the metal salts in 100 ml. of toluene such that the addition of 1 ml. of the stock solution to 50 ml. of gasoline provided 0.4 mg. of the metal corresponding to a concentration of 8 parts per million (p.p.m.). The metal salts used per 100 ml. of toluene to prepared the stock solutions are listed below. Since the metal salts used were commercially available materials and the exact composition of the anionic portion of the metal salts as well as other materials present were not known, the metal content for each salt is also given in the following list.

| Metal Salt | Amount/100 ml. Toluene (g.) |
|---|---|
| Copper octanoate (18% Cu) | 0.22 |
| Chromium naphthenate (6.9% Cr) | 0.58 |
| Cobalt linoleate (8.2% Co) | 0.47 |
| Iron naphthenate (6.0% Fe) | 0.67 |
| Vanadium naphthenate (4.7% Va) | 0.85 |
| Managanes stearate (8.9% Mn) | 0.45 |

To demonstrate the effect of 1,1,1-tris(salicylideneaminomethyl)propane on the metals, about 2 equivalents of the compound (5.3 mg.) were added to 50 ml. of the gasoline containing the metal salt, to give a concentration of 0.01%. Metal concentration was 8 p.p.m. The induction test results are summarized in the following Table in which two numbers indicate results achieved on duplicate tests.

TABLE I.—GASOLINE BOMB INDUCTION TIMES

| | | Induction period (Min.) | |
|---|---|---|---|
| Designation | Metal Salt | No additive | Additive present |
| Control | None | 805 | 945 |
| Example: | | | |
| 1 | Copper octanoate | 88,900 | 1,122 |
| 2 | Chromium naphthenate | 313,340 | 825 |
| 3 | Cobalt linoleate | 260,273 | 918 |
| 4 | Iron naphthenate | 635,630 | 970 |
| Comparison: | | | |
| 1 | Vanadium naphthenate | 695,672 | 82 |
| 2 | Manganese stearate | 173,170 | 206 |

The data show that each of the metals is an oxidation catalyst for gasoline, with copper showing the greatest effect. The data also show that 1,1,1-tris(salicylideneaminomethyl)propane is an effective deactivator for copper, chromium, cobalt and iron as shown by the restoration of the induction periods. The slight increase in the induction period when the additive was added to the control may indicate the presence of a small amount of catalytic metal in the gasoline.

Comparison 1 shows that when 1,1,1-tri(salicylideneaminomethyl)propane is added to the gasoline containing a vanadium salt, the additive instead of suppressing the catalytic activity of vanadium actually forms a strongly catalytic combination equally as potent as copper. The Table clearly demonstrates not only the unexpected deactivating activity of the 1,1,1-tris(salicylideneaminomethyl)alkanes on copper, chromium, iron and cobalt but also the unpredictability of their metal deactivating properties since enhanced activation is obtained with vanadium metal (Comparison 1) and very little effect is obtained with manganese (Comparison 2). Such specificity is unpredictable.

EXAMPLES 5 TO 7 AND COMPARISONS

These Examples and Comparisons illustrate the deactivating effects of 1,1,1-tris(salicylideneaminomethyl)propane on copper, iron, and cobalt in the oxidation of gasoline when the metal compounds used are metal acetylacetonates.

As is known, metal acetylacetonates are stable metal chelates of acetylacetone prepared by known procedures of combining metal salts with acetylacetone. As in the previous Examples and Comparisons, stock solutions of the metal compounds were prepared by dissolving the indicated amount of the metal acetylacetonate in 100 ml. of the indicated solvent such that the addition of 1 ml. of the stock solution of the metal compound to 50 ml. of gasoline provided 0.4 mg. of the metal (18 p.p.m.). The metal acetylacetonate and the solvents used are listed below.

| Wt. (g.)/100 ml. solvent | Metal acetylacetonate (AcAc) | Solvent |
|---|---|---|
| 0.208 | Vanadium (AcAc)$_3$ | Methylenedichloride. |
| 0.256 | Manganese (AcAc)$_3$ | Do. |
| 0.265 | Iron (AcAc)$_3$·H$_2$O | Do. |
| 0.243 | Cobalt (AcAc)$_3$ | Do. |
| 0.188 | Nickel (AcAc)$_2$·H$_2$O | Ethanol. |
| 0.168 | Copper (AcAc)$_2$ | Methylenedichloride. |

The induction period tests carried out were ASTM-D524 Method described earlier. To demonstrate the effects of 1,1,1-tris(salicylideneaminomethyl)propane on the metals, about 2 equivalents of the compound (5.3 mg.) were added to 50 ml. of the gasoline containing the metal acetylacetonate to give a concentration of 0.01%. The induction test results are summarized in the following Table.

TABLE II.—GASOLINE BOMB INDUCTION TIMES

| | | Induction period (min.) | |
|---|---|---|---|
| Designation | Metal compound | No additive | Additive present |
| Control | None | 835 | 945 |
| Example: | | | |
| 5 | Iron (AcAc)$_3$ | 205 | 816 |
| 6 | Cobalt (AcAc)$_3$ | 540 | 830 |
| 7 | Copper (AcAc)$_2$ | 82 | 808 |
| Comparison: | | | |
| 3 | Nickel (AcAc)$_2$ | 735 | 645 |
| 4 | Manganese (AcAc)$_3$ | 184 | 58 |
| 5 | Vanadium (AcAc)$_3$ | 375 | 110 |

The data show that iron, cobalt, and copper are deactivated by 1,1,1-tris(salicylideneaminomethyl)propane, as shown by the essential restoration of the induction periods, Examples 5, 6 and 7. The catalytic oxidation effects of manganese (Comparison 4) and vanadium (Comparison 5) are markedly enhanced by the presence of 1,1,1-tris(salicylideneaminomethyl)propane while the catalytic oxidation effects of nickel (Comparison 3) are somewhat enhanced.

EXAMPLE 8

This Example illustrates the effectiveness of 1,1,1-tris(salicylideneaminomethyl)propane in reducing the oxidation of automotive lubricating oil. As is well known, during the operation of an internal combustion engine, metal compounds are introduced into the crankacse lubricant, usually as the result of corrosion and wear of the metal parts. In the present automobile engines, iron is the predominant metal introduced into the lubricating oil although chromium and cobalt as well as copper may also be present. Compounds of these metals can catalyze the oxidation of the lubricating oils to produce harmful deposits and varnish. The deactivation of these catalysts should result in the decreased oxidation of the lubricating oil.

The lubricating oil oxidation test used was the MS Sequence VB test which is carried out with a multicylinder engine under controlled conditions. The lubricating oil contained various commercial additives as follows: 9% viscosity index improver/pour point depressant, 1.2% extreme pressure additive/antiwear agent/antioxidant, 2.25% detergent/antirust agent, 0.025% antifoam agent, and 4% ashless dispersant. The test results are summarized in the following Table.

TABLE III.—MS SEQUENCE VB TEST RESULTS

| | Control oil | Control oil plus 0.1% additive | Control oil plus 0.1% additive plus 0.76% antioxidant |
|---|---|---|---|
| Total sludge [1] | 41.5 | 43.3 | 44.9 |
| Total varnish [1] | 33.0 | 34.5 | 37.4 |
| Piston skirt [2] | 7.5 | 8.0 | 8.2 |
| Percent positive crankcase ventilation valve pluggage | 31.0 | 12.0 | 6.0 |

[1] Clean=50.
[2] Clean=10.

The results show that addition of 1,1,1-tris(salicylideneaminomethyl)propane results in reduced oxidation of the lubricating oil.

Reduced oxidation is indicated by the decreased sludge and varnish formation, increased cleanliness of the piston skirt, and reduced pluggage of the positive crankcase ventilation valve. The data also show that further decrease in the oxidation of the lubricating oil is obtained when an additional antioxidant is used. In this instance, the antioxidant employed was octylphenyl-β-naphthylamine.

The embodiments of the invention in which an exclusive property or privilege is claimed are defined as follows:

1. A composition comprising an organic composition ordinarily susceptible to catalytic oxidation by a metal selected from the group consisting of copper, iron, cobalt, chromium and compounds thereof, selected from the group consisting of gasoline, jet fuel, kerosene, diesel fuel oil, home burner fuel oil, lubricating oil, and lubricating grease, and an effective metal-deactivating amount of a deactivating compound of the formula

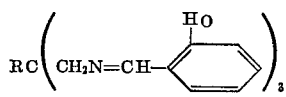

wherein R is hydrogen or an alkyl group of 1 to 20 carbon atoms.

2. A composition according to Claim 1 wherein the organic composition is distillate hydrocarbon fuel.
3. A composition according to Claim 2 wherein the organic composition is gasoline.
4. A composition according to Claim 1 wherein the organic composition is lubricating oil.
5. A composition according to Claim 1 wherein R is H.
6. A composition according to Claim 1 wherein R is an alkyl group of 1 to 4 carbon atoms.
7. A composition according to Claim 1 containing from about 0.001% to 0.5% by weight of the deactivating compound.
8. A composition according to Claim 7 containing from 0.01% to 0.1% by weight of the deactivating compound.
9. A composition according to Claim 1 wherein the deactivating compound is 1,1,1-tris(salicylideneaminomethyl)propane.
10. A composition of Claim 1 additionally containing an antioxidant—selected from the group consisting of hydrocarbyl substituted arylamines and hydrocarbyl substituted phenols.
11. A composition according to Claim 10 wherein the antioxidant is octylphenyl-β-naphthylamine.

References Cited
UNITED STATES PATENTS

| | | | |
|---|---|---|---|
| 2,009,480 | 7/1935 | Craig | 252—50 X |
| 2,264,896 | 12/1941 | Bahlke | 252—51.5 R |
| 3,071,451 | 1/1963 | Schmerling | 44—73 |
| 3,696,851 | 10/1972 | Randell | 252—50 X |

OTHER REFERENCES

F. P. Dwyer et al. "Sexadentate Chelate Compounds", 1957, pgs. 1269–1273, J. Am. Chem. Soc., 79.

PATRICK P. GARVIN, Primary Examiner
A. H. METZ, Assistant Examiner

U.S Cl. X.R.
44—72, 73